June 7, 1949. A. G. WILLS 2,472,557
VEHICLE FOR TRANSPORTING TANKS
Filed Nov. 5, 1946 3 Sheets-Sheet 1
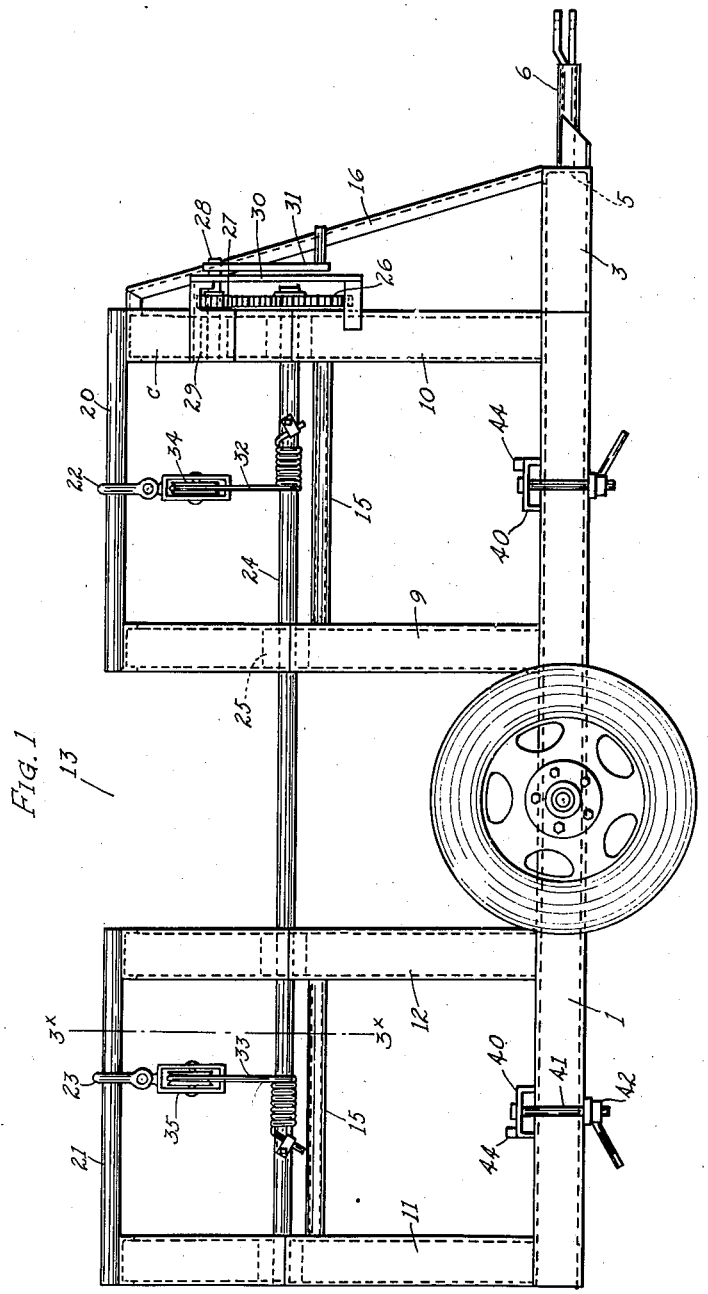
INVENTOR.
Alton G. Wills
BY
Munn, Liddy, Glaccum & Rich
Attys.

June 7, 1949.　　　　A. G. WILLS　　　　2,472,557
VEHICLE FOR TRANSPORTING TANKS
Filed Nov. 5, 1946　　　　　　　　　　3 Sheets-Sheet 2
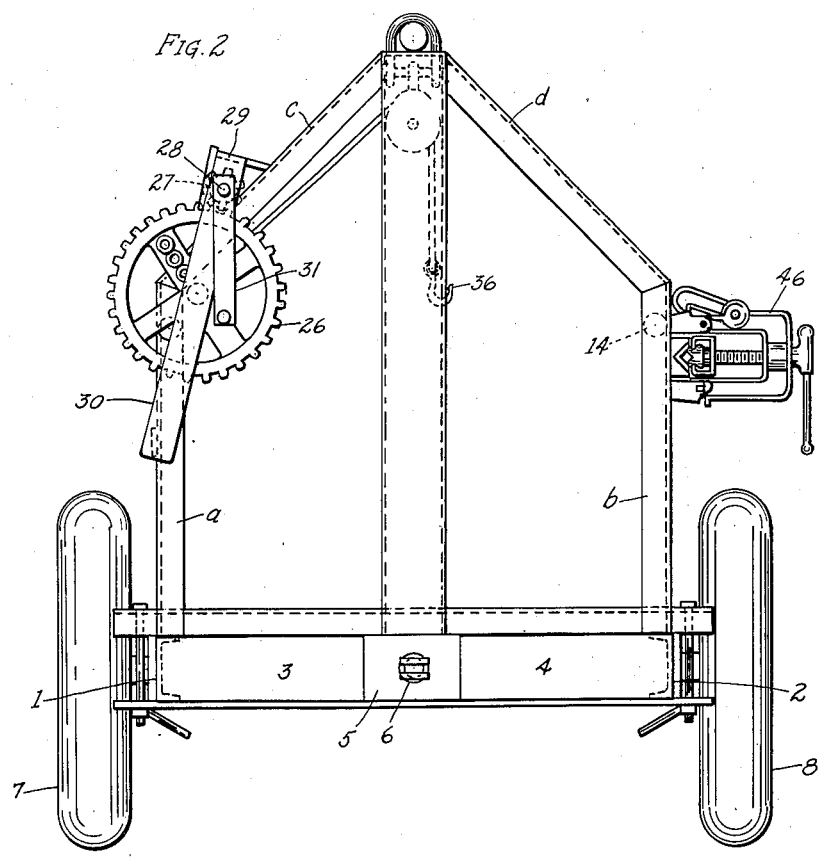
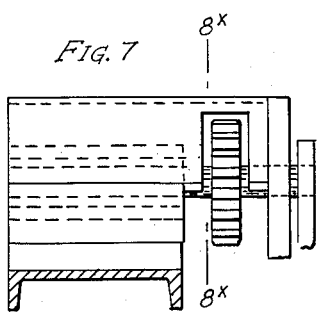
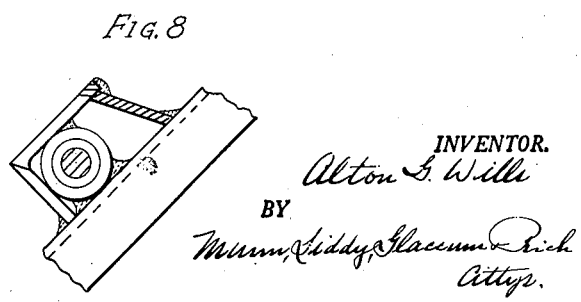
INVENTOR.
Alton G. Wills
BY
Munn, Liddy, Glaccum & Rich
Attys.

June 7, 1949. A. G. WILLS 2,472,557
VEHICLE FOR TRANSPORTING TANKS
Filed Nov. 5, 1946 3 Sheets-Sheet 3
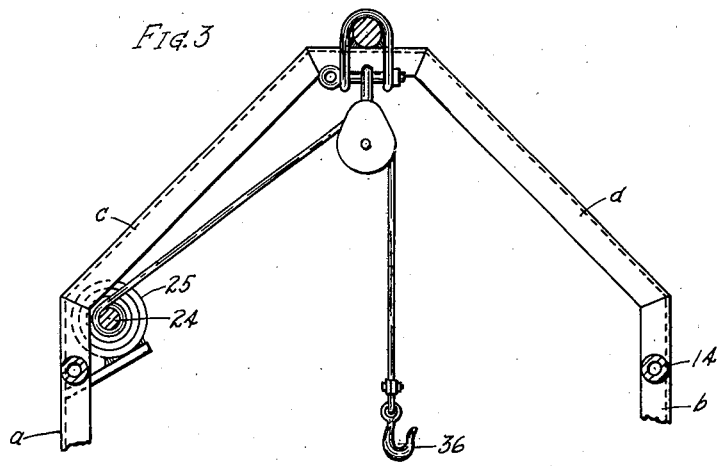
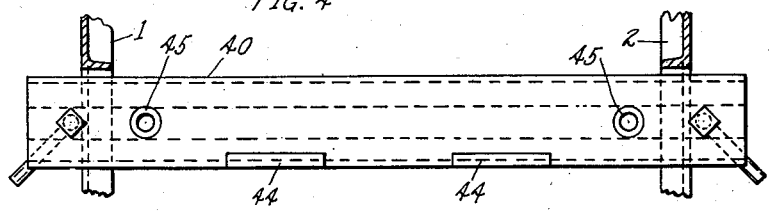
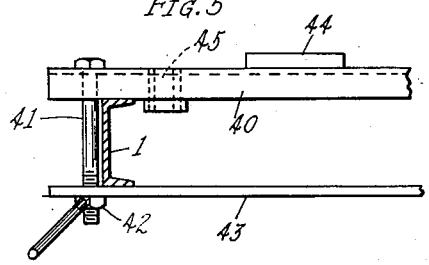 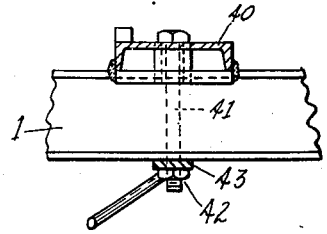
INVENTOR.
Alton G. Wills
BY
Munn, Liddy, Glaccum & Nick
Attys.

Patented June 7, 1949

2,472,557

UNITED STATES PATENT OFFICE 2,472,557

VEHICLE FOR TRANSPORTING TANKS

Alton G. Wills, Robstown, Tex.

Application November 5, 1946, Serial No. 707,839

3 Claims. (Cl. 214—75)

My present invention relates to vehicles for transporting heavy cumbersome objects such as metal tanks made of boiler plate which because of their size, shape and weight are difficult to handle. It has for its object to provide a vehicle in the nature of a trailer for a truck or automobile comprising a chassis, or frame, open at its rear end and having an open bottom and a superstructure comprising a series of spaced arch shaped members carrying hoisting devices by means of which the article to be transported may be elevated into carrying position and the load firmly anchored.

To these and other ends my invention comprehends further improvements and arrangements of parts all as will be fully described in the accompanying specification, the novel features thereof being set forth in the appended claims.

In the drawings:

Figure 1 is a side elevation of a vehicle showing one embodiment of my invention.

Figure 2 is a front elevation thereof.

Figure 3 is a transverse vertical sectional view taken on the line $3^x$—$3^x$ of Fig. 1.

Figure 4 is a top plan view of one of the saddle pieces.

Figure 5 is an enlarged horizontal elevation of one end of a saddle piece.

Figure 6 is an end view of the parts shown in Fig. 5.

Figure 7 is a detail side elevation of the mounting of the pinion of the hoisting mechanism on the side of the forward arch.

Figure 8 is a sectional view of said mounting taken on the line $8^x$—$8^x$ of Fig. 7.

Similar reference characters in the several figures indicate similar parts.

A vehicle embodying my invention comprises a horizontal frame or chassis composed of the spaced side pieces 1 and 2 of channel iron, the forward ends of which are bent inwardly, as indicated by 3 and 4, and united to a front draw piece 5 to which a draw bar or other connection 6 may be connected either rigidly or otherwise. This frame is supported at the balance point of the vehicle, which is approximately at the center of the side pieces, on a pair of wheels 7—8 journaled on axles rigidly connected to and projecting laterally from the outer faces of the frame.

Rising vertically from the chassis are forward and rear pairs of arches 9—10 and 11—12 which are spaced apart to provide a free space 13 above the center of the frame for the accommodation of the dome or other projection structure with which certain makes of tanks are provided. The construction of these several arch members is similar. They are made with vertical leg portions $a$ and $b$ of channel form secured at their lower ends to the side pieces 1 and 2, preferably by welding them to the inwardly extending horizontal faces of the latter. The upper ends of the channels $a$ and $b$ converge, as indicated by $c$ and $d$, to provide an elevated inverted V shape to the top of the arch, their meeting extremities being welded together. Near the upper ends of the legs, those of the respective pairs are connected by bracing members 14—15, there being two of each of these braces for each arch, one located on the right and the other on the left hand side of the vehicle. Also extending diagonally upward from the draw piece 5 to the top of the forward arch 10 is a bracing member 16.

The tops or ridge points of the forward pair of arches 9—10 are connected by a bar 20 and a similar bar 21 connects the apices of the rear arches 11—12. These bars are cylindrical in cross section and each of them carries a clevis, as indicated at 22 and 23. These clevises carry the load and, in order that they may be properly located with reference to the object to be carried they are adjustable forwardly and rearwardly between the respective arches, as will be understood.

The load hoisting mechanism comprises a shaft 24 carried in roller bearings mounted in rings 25 secured within the sides of the channel pieces of the several arches and within the angles formed by the joinder of legs $a$ with the converging portions $c$ of the arches. At its forward end shaft 25 carries a gear wheel 26 which meshes with and is rotated by a pinion 27 carried on a stub shaft 28 journaled in the bearing 29 mounted on the outer side of the portion $c$ of the forward arch member. The outer end of the shaft 28 is also journaled in a strap piece or brace arm 30 the upper end of which extends over the pinion and is connected to the box of the pinion journal bearing 29, its other end extending beyond the face of gear 26 and being connected to leg $a$ of the forward arch. A crank handle 31 serves as the means of rotating the pinion 27.

There are two hoisting cables 32—33 received through pulleys 34—35 suspended from the clevises 22—23 and provided at their free ends with load hooks 36 (see Fig. 3). The other ends of these cables are attached to shaft 24 (see Fig. 1), there being sufficient surplus to permit the hooks to be lowered such distance as may be required when setting a tank in an excavation.

The vehicle frame is also provided with removable saddle members for supporting the load during transportation. These are indicated at 40. They are channel pieces which extend across the tops of the chassis rails 1 and 2 between the members forming the respective pairs of arches. Their ends extend beyond said rails and are adjustably held in place thereon by bolts 41 carrying nuts 42 which clamp against the lower side of a clamping strip 43 which extends across the lower side of the chassis rails. On the upper faces of these saddles I mount spaced chocks 44 which serve to center the load thereon. The saddle pieces are further provided at each end, at points falling within the inner sides of the frame of the chassis with thimbled apertures 45 (Figs. 4 and 5) through which chains may be passed for securing a load. Alternatively stakes may be inserted in these openings to support the sides of a load, or in cases where a tank is provided with foot portions having bolt holes the saddle pieces may be adjusted to aline the apertures 45 therewith and bolts passed through said parts to hold the load in place.

As an accessory I have shown in Fig. 2 a pipe vise 46 mounted on the right hand side of the vehicle.

In the operation of a vehicle in picking up a load the rear saddle piece 40 is first disconnected and the forward one loosened and pushed forwardly. The trailer is then backed over a tank and centered longitudinally therewith. The pulleys 34—35 are then alined with the usual handling ears or other points of attachment on the tank and the cable load hooks 36 attached thereto. When the load has been lifted into the frame arches by the winch so that its lower side is above the chassis rails the saddles 40 are slipped in place, adjusted and secured by the bolts 41 whereupon the load is lowered onto the saddles between the chock blocks 44 and secured to the saddles as before explained.

I claim:

1. A tank transporting vehicle comprising a chassis having a pair of supporting wheels, parallel rails supported at their mid point on said wheels and connected at their forward ends, pairs of spaced arches symmetrically mounted on the front and rear portions of the rails, said pairs being spaced from each other to provide an unobstructed opening over said wheels, members connecting the tops of the respective pairs of arches, clevises longitudinally adjustable on said members, pulley blocks carried by the clevises, separate hoisting cables passing therethrough, and a shaft for winding said cables and means for rotating it.

2. A tank transporting vehicle comprising a chassis composed of parallel side rails connected at their forward ends, supporting ground wheels mounted at a mid point on the rails, a pair of spaced arches extending above the forward end of the rails, a similar pair of arches spaced from the first mentioned pair and extending above the rear portion of the rails, connecting members between the tops of the arches of said pairs located in the central plane of the chassis, hoisting devices embodying pulley blocks adjustable longitudinally of said members, separate cables carried by the pulley blocks, a shaft journaled on said arches for winding the cables, a means for rotating the shaft.

3. A tank transporting vehicle comprising a chassis having side rails connected at their forward ends, supporting ground wheels mounted at a mid point on the rails, arches at the front and rear extremities of said rails and similar arches located intermediately to provide a free unobstructed space above the wheel area, each arch comprising vertical side legs the upper ends of which converge and meet over the longitudinal center of the chassis, stabilizing members connecting the upper ends of the vertical legs and the top centers of the pairs of arches, pulley blocks adjustable lengthwise of the members connecting the tops of the arches, a windless shaft journaled on the inner edges of the upper end of the legs on one side of the several arches, a gear thereon, a pinion for rotating it journaled on one of the arches and cables attached to said shaft having their free ends rove through the pulley blocks.

ALTON G. WILLS.

REFERENCES CITED

The following references are of record in the file of this patent:

UNITED STATES PATENTS

| Number | Name | Date |
|---|---|---|
| 821,954 | McCormick | May 29, 1906 |
| 1,531,180 | Erickson | Mar. 24, 1925 |
| 2,266,866 | Houston | Dec. 23, 1941 |
| 2,296,611 | Green | Sept. 22, 1942 |
| 2,321,198 | Graves | June 8, 1943 |
| 2,404,898 | Aycock | July 30, 1946 |
| 2,427,667 | Gilbert | Sept. 23, 1947 |